United States Patent [19]

Kato et al.

[11] Patent Number: 5,322,205
[45] Date of Patent: Jun. 21, 1994

[54] JOINING METHOD OF ALUMINUM MEMBER TO DISSIMILAR METAL MEMBER

[75] Inventors: Shuichiro Kato; Masao Kinoshita; Hiroshi Ikami, all of Osaka, Japan

[73] Assignee: Nippon Aluminum Co., Ltd., Osaka, Japan

[21] Appl. No.: 51,293

[22] Filed: Apr. 23, 1993

Related U.S. Application Data

[63] Continuation of Ser. No. 871,326, Apr. 21, 1992, abandoned.

Foreign Application Priority Data

Apr. 22, 1991 [JP] Japan .................. 3-090451

[51] Int. Cl.⁵ .............................................. B23K 1/06
[52] U.S. Cl. ................................. 228/110.1; 228/208; 228/262; 228/254
[58] Field of Search ............... 228/110.1, 208, 262, 228/262.5, 254, 111

[56] References Cited

U.S. PATENT DOCUMENTS

| | | | |
|---|---|---|---|
| 3,287,540 | 11/1966 | Connelly | 228/208 |
| 3,482,305 | 12/1969 | Dockus et al. | 228/208 |
| 3,680,200 | 8/1972 | Terrill et al. | 228/111 |
| 3,855,679 | 12/1974 | Schmatz | 228/209 |
| 3,970,237 | 7/1976 | Dockus | 228/208 |
| 3,979,043 | 9/1976 | Lowery | 228/208 |
| 3,993,236 | 11/1976 | Antonevich | 228/110 F |
| 4,613,069 | 9/1986 | Falke et al. | 228/208 |

OTHER PUBLICATIONS

American Society for Metals, Metals Handbook, 9th ed., vol. 6 pp. 1030-1031, Aug. 1971.

Primary Examiner—P. Austin Bradley
Assistant Examiner—Chuck Y. Mah
Attorney, Agent, or Firm—Armstrong, Westerman, Hattori, McLeland & Naughton

[57] ABSTRACT

A joining method of an aluminum member to a dissimilar metal member excluding copper by brazing or soldering through the use of a brazing filler metal or a solder for aluminum member; in which a plating composed of a metal voluntarily selected from copper, aluminum, zinc, lead, silicon, cadmium, tin and an alloy having major component of two or more kinds of them, is previously applied on a surface of joined portion of the dissimilar metal member, the plated joined portion of the dissimilar metal member is dipped in a molten brazing filler metal or a molten solder and ultrasonic vibration is given to the joined portion to stick the brazing filler metal or the solder to the joined portion, and a brazing or a soldering is carried out thereafter.

1 Claim, 3 Drawing Sheets

JOINING METHOD OF ALUMINUM MEMBER TO DISSIMILAR METAL MEMBER

This application is a continuation of application Ser. No. 07/871,326 filed Apr. 21, 1992, now abandoned.

DESCRIPTION

Background Art

1. Industrial useful Field

This invention relates to a joining method of an aluminum member (i.e. aluminum or aluminum alloy) to a dissimilar metal member excluding copper by brazing or soldering through the use of a brazing filler metal or a solder for aluminum member.

2. Prior art and its problem

In Examined Published Patent Application No. 55-4031, there is disclosed a joining method of an aluminum pipe to a copper pipe by soldering through the use of a solder for aluminum member (JIS Z-3281, for example). In this method; a copper pipe is dipped in a molten solder and ultrasonic vibration is given to it so as to apply a solder plating on a surface of a joined portion of the copper pipe, while the solder -plating is also applied on a surface of a joined portion of the aluminum pipe in the same way, so that the both are joined by melting the solder platings again.

In the above method, however, the joining procedure became impossible when other metals such as an iron alloy were used in place of the copper, because the solder for aluminum member was not stuck to a surface of the iron alloy. In order to accomplish the joining to the iron alloy, a brazing method could be thought out. In the brazing method, however, it required much labor in order to take an after-treatment of flux after joining.

SUMMARY OF THE INVENTION

An object of this invention is to provide a joining method of an aluminum member to a dissimilar metal member excluding copper by brazing or soldering through the use of a brazing filler metal or a solder for aluminum member.

In the method of this invention for joining the aluminum member to the dissimilar metal member; a plating composed of a metal voluntarily selected from copper, aluminum, zinc, lead, silicon, cadmium, tin and an alloy having major component of two or more kinds of them, is previously applied on a surface of joined portion of the dissimilar metal member, the plated joined portion of the dissimilar metal member is dipped in a molten brazing filler metal or a molten solder and ultrasonic vibration is given to the joined portion to stick the brazing filler metal or the solder to the joined portion, and a brazing or a soldering is carried out thereafter.

In case when the brazing filler metal or the solder is stuck to the joined portion of the dissimilar metal member on which the plating composed of the foregoing selected metal is applied, the following reaction is supposed to occur. A layer composed of an intermetallic compound and an oxide is formed on an inter-face between the above plating and the brazing filler metal or the solder. This layer is peeled off by a cavitation caused by the ultrasonic vibration, and a plating component of this layer diffuses in the brazing filler metal or the solder in this instance, while taking oxygen away from the oxide on the surface of dissimilar metal member. The surface of the dissimilar metal member is activated thereby to produce a wetting on the brazing filler metal or the solder, so that a compound layer comprising a component of brazing filler metal or solder and a component of dissimilar metal member is formed on the surface of dissimilar metal member. At the same time, the brazing filler metal or the solder is firmly joined through the compound layer so as to form a plating layer comprising the brazing filler metal or the solder.

DETAILED DESCRIPTION OF THE INVENTION

Embodiment

An embodiment of this invention will be described with reference to the drawings. A solder for aluminum member is used and copper is used for the plating which is applied previously, in this instance.

Figure 1:
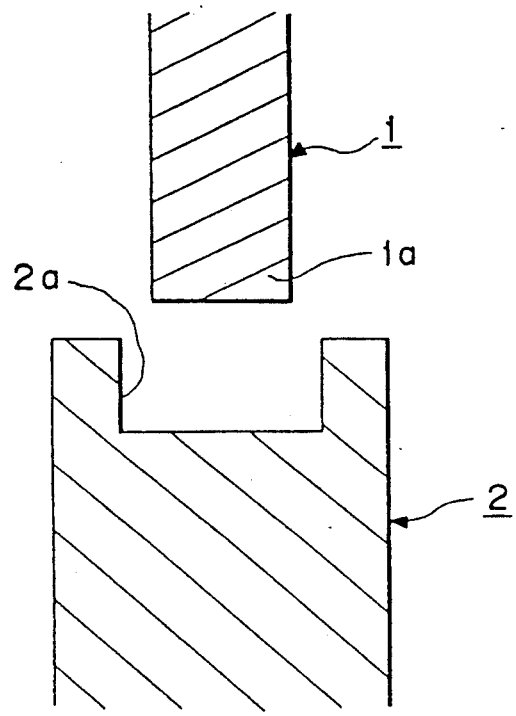
FIG. 1 is a vertical sectional view showing an aluminum member and a dissimilar metal member joined by this invention.

FIG. 1 is the vertical sectional view showing the aluminum member and the dissimilar metal member joined by this invention. In FIG. 1, 1 denotes an Invar alloy (Fe-42% Ni alloy) serving as the dissimilar metal member, 2 denotes an aluminum alloy (A6063, A1050 for example) serving as the aluminum member. The joining is carried out between an end portion 1a of the Invar alloy 1 and a concave portion 2a of the aluminum alloy 2.

Figure 2:
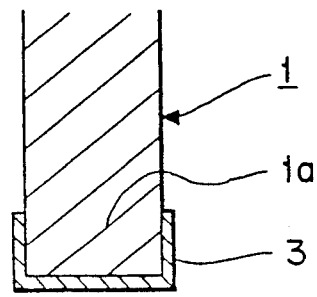
FIG. 2 is a vertical sectional view showing a first process of a method of this invention.

FIG. 2 through FIG. 6 are vertical sectional views showing processes, in order, according to the method of this invention. As shown in FIG. 2, a copper plated layer 3 is formed on a surface of the end portion (joined portion) 1a of the Invar alloy 1. This plating treatment is carried out through processes composed of degreasing, washing, electrolysis, washing and drying. Electrolytic conditions of this case are as listed in Table 1. A copper plated layer 3 having a thickness of about several microns was prepared by setting an electrolytic time to about 1 through 3 minutes.

| Composition of electrolytic bath | | Electrolytic condition |
| --- | --- | --- |
| Copper cyanide | 25 g/l | pH: 11.3 |
| Soda cyanide | 20 g/l | Temperature: 50 to 60° C. |
| Rochelle salt | 25 g/l | Cathode current density: |
| Soda carbonate | 20 g/l | 2 to 6 A/dm$^2$ |
| | | Pole ratio: 1.5:1 to 6:1 |
| | | Anode: Copper plate |

Figure 3:
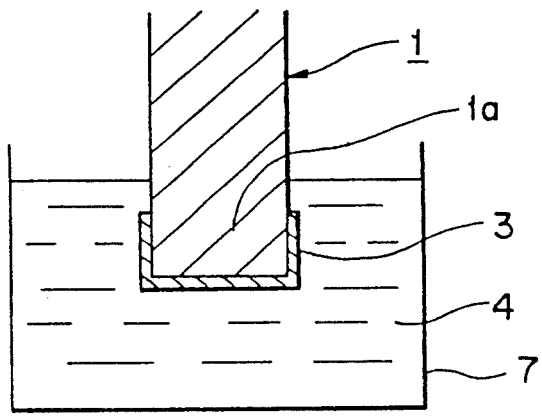
FIG. 3 s a vertical sectional view showing a second process of the method of this invention.
Figure 4:
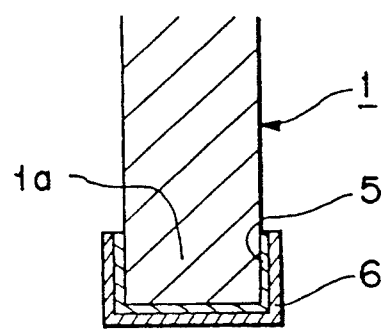
FIG. 4 is a vertical sectional view showing a third process of the method of the invention.

In the next stage, a portion of the copper plated layer 3 of the Invar alloy 1 on which the copper plated layer 3 is formed is dipped in a molten solder 4 and ultrasonic vibration is given to the Invar alloy 1 or a solder bath 7 through a proper horn, as shown by FIG. 3. Zn-5%Al serving as a solder for aluminum member is used for the solder 4. A melting point of this solder is 380° C. A frequency of the ultrasonic vibration is to be about 17.6 KHz. Cavitation will be induced when the ultrasonic vibration is given. The following reaction is supposed to occur in this instance. A layer composed of an intermetallic compound and an oxide is formed on an interface between the copper plated layer 3 and the solder 4. This layer is peeled off by a cavitation caused by the ultrasonic vibration, and the copper in this layer diffuses in the solder 4 in this instance while taking oxygen away from the oxide on a surface of the Invar alloy 1. The surface of the Invar alloy 1 is activated thereby to produce a wetting on the solder 4, so that a compound layer 5 comprising a component of solder 4 and a component of Invar alloy 1 is formed on the surface of the Invar alloy 1 as shown by FIG. 4. At the same time, the solder 4 is firmly stuck thereto through the compound layer 5 so as to form a solder plated layer 6.

Figure 5:
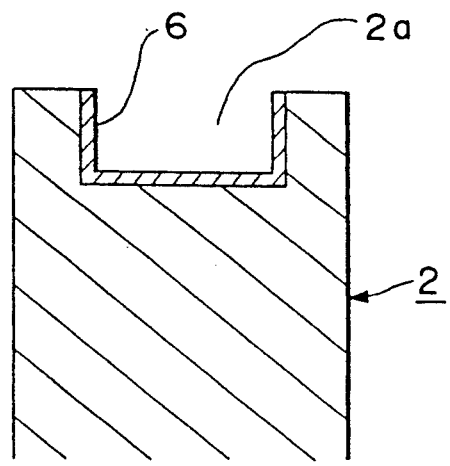
FIG. 5 s a vertical sectional view showing a fourth process of the method of this invention.

On the other hand, as shown in FIG. 5, the plated layer 6 comprising the solder 4 is also formed on a wall surface of a concave portion 2a of the aluminum alloy 2. This plating process is carried out in such a way that the aluminum alloy 2 is dipped- n the molten solder 4 and the ultrasonic vibration is given to the aluminum alloy 2 or a solder bath 7, in the same manner as illustrated by FIG. 3.

Figure 6:
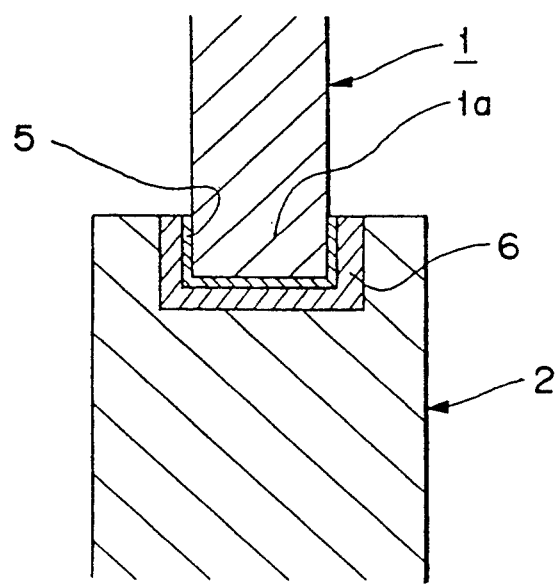
FIG. 6 is a vertical sectional view showing a fifth process of the method of this invention.

As shown in FIG. 6, the solder plated layer 6 of the Invar alloy 1 is mated with the solder plated layer 6 of the aluminum alloy 2 and the both plated layers 6 are molten. At the same time, the ultrasonic vibration is given to the Invar alloy 1 or the aluminum alloy 2 so as to connect the Invar alloy 1 to the aluminum alloy 2.

As described above, in the method of this invention, the compound layer 5 is formed by making up the copper plated layer 3, and the solder plated layer 6 is firmly stuck to the Invar alloy 1 by putting the compound layer 5 between them. Consequently, the Invar alloy 1 and the aluminum alloy 2 are joined by soldering by putting the solder plated layer 6 between them. A temperature for forming the solder plated layer 6 is about 400° C. required to melt the solder 4.

Moreover, the solder plated layer 6 can be formed by giving the ultrasonic vibration, without using a flux. Therefore, after-treatment for flux is not necessary, and there is no chance for the Invar alloy 1 and the aluminum alloy 2 to be corroded by the flux.

Effect of the invention

As described above, in this invention, the solder plated layer 6 can be stuck firmly to the surface of the end portion 1a through the compound layer 5 because the copper plated layer 3 is previously formed on the surface of the end portion (joining portion) 1a of the Invar alloy 1, so that the Invar alloy 1 can be joined to the aluminum alloy 2 by soldering by putting the solder plated layer 6 between them.

In addition, the after-treatment of flux can be neglected and the corrosion of the Invar alloy 1 and the aluminum alloy 2 due to the flux can be prevented, because the solder plated layer 6 can be formed without using the flux. Accordingly, the brazing work can be simplified and qualities of the Invar alloy 1 and the aluminum alloy 2 after the work can be improved.

Another embodiment

The solder for aluminum member is used in the above embodiment, however, materials other than the solder can be used provided that they come within a category of the brazing filler metal for aluminum member. The copper is used for the plating metal previously applied in the above embodiment, however, other metals may be used in place of it; such as aluminum, zinc, lead, silicon, cadmium, tin and an alloy having major component of two or more kinds of them.

Even when these metals are used, the same function and effect as the above embodiment can be accomplished. In case when the brazing filler metal or the solder is stuck to the joined portion of the dissimilar metal member on which the plating composed of the foregoing selected metal s applied, the following reaction is supposed to occur. A layer composed of an intermetallic compound and an oxide is formed on an interface between the above plating and the brazing filler metal or the solder. This layer is peeled off by a cavitation caused by the ultrasonic vibration, and a plating component of this layer diffuses in the brazing filler metal or the solder in this instance, while taking oxygen away from the oxide on the surface of dissimilar metal member. The surface of the dissimilar metal member is activated thereby to produce a wetting on the brazing filler metal or the solder, so that a compound layer comprising a component of brazing filler metal or solder and a component of dissimilar metal member is formed on the surface of dissimilar metal member. At the same time, the brazing filler metal or the solder is firmly stuck thereto through the compound layer so as to form a plating layer comprising the brazing filler metal or the solder.

Titanium and stainless steel etc. may be used for the dissimilar metal member, and aluminum and other aluminum alloys may be used for the aluminum member. Further, it is not always required to give the ultrasonic vibration when joining the Invar alloy 1 to the aluminum alloy 2.

What is claimed is:

1. A method for joining an aluminum member to a dissimilar metal member, excluding copper, by soldering through the use of a solder for said aluminum member comprising the steps of:
    plating a metal selected from the group consisting of copper, aluminum, zinc, lead, silicon, cadmium, tin and alloys thereof having a major component of one or more such metal, on a surface of said dissimilar metal member to be joined to said aluminum member,
    dipping said plated portion of said dissimilar metal into a molten solder to form a layer of an intermetallic compound and an oxide on a surface of said plated portion,
    ultrasonically vibrating said plated portion of said dissimilar metal member while in said dipping state in said molten solder so as to peel off said layer of said intermetallic compound and said oxide together with said plating, thereby activating the surface of said dissimilar metal member and producing a wetting with the solder, and making the solder adhere to said activated surface of said dissimilar metal member,
    adhering molten solder to a surface of said aluminum member where said aluminum member is to be joined to said activated surface of said dissimilar member where said molten solder is adhered,
    contacting said molten solder on said surface of said aluminum member where said aluminum member is to be jointed to said dissimilar metal with the molten solder on said activated surface of said dissimilar member and cooling said contacting solder on said aluminum member and said dissimilar member and thereby joining said dissimilar metal to said aluminum member as said contacting solder cools.

* * * * *